United States Patent
Hayashi

(10) Patent No.: US 9,102,064 B2
(45) Date of Patent: Aug. 11, 2015

(54) MULTI-JOINT ROBOT HAVING GAS SPRING, AND METHOD FOR ESTIMATING INNER PRESSURE OF THE GAS SPRING

(71) Applicant: FANUC CORPORATION, Yamanashi (JP)

(72) Inventor: Yu Hayashi, Yamanashi (JP)

(73) Assignee: Fanuc Corporation, Yamanashi (JP)

( * ) Notice: Subject to any disclaimer, the term of this patent is extended or adjusted under 35 U.S.C. 154(b) by 0 days.

(21) Appl. No.: 14/228,548

(22) Filed: Mar. 28, 2014

(65) Prior Publication Data

US 2014/0297032 A1    Oct. 2, 2014

(30) Foreign Application Priority Data

Mar. 29, 2013  (JP) .................................. 2013-071433

(51) Int. Cl.
*B25J 9/16* (2006.01)
*B25J 19/00* (2006.01)

(52) U.S. Cl.
CPC ............ *B25J 9/1674* (2013.01); *B25J 19/0012* (2013.01); *G05B 2219/36406* (2013.01)

(58) Field of Classification Search
CPC ............... B25J 9/1674; B25J 19/0012; G05B 2219/24004
USPC ....................................................... 700/245
See application file for complete search history.

(56) References Cited

U.S. PATENT DOCUMENTS

2010/0212305 A1    8/2010   Runesson et al.

FOREIGN PATENT DOCUMENTS

| JP | S61-109679 A | 5/1986 |
| JP | S63-180491 A | 7/1988 |
| JP | H06-031680 A | 2/1994 |
| JP | 10138189 A | 5/1998 |
| JP | H11-048185 A | 2/1999 |
| JP | 2007298513 A | 11/2007 |
| JP | 2009-226488 A | 10/2009 |
| JP | 2009270987 A | 11/2009 |
| JP | 2012519083 A | 8/2012 |

*Primary Examiner* — Khoi Tran
*Assistant Examiner* — Abby Lin
(74) *Attorney, Agent, or Firm* — Fredrikson & Byron, P.A.

(57) ABSTRACT

A multi-joint robot having a function for estimating an amount of decrease in inner pressure of a gas spring, by means of a simple and low-cost structure, and a method for estimating the amount of decrease in inner pressure of the gas spring. The gas pressure within a cylinder of the gas spring decreases in connection with the motion of a lower arm associated with the gas spring. In the present invention, in view of a finding that the amount of decrease in inner pressure has a high correlation with a total movement distance obtained by integrating an amount of back-and-forth motion of a piston rod relative to a cylinder, an amount of decrease in inner pressure within the gas spring is estimated by calculating the total movement distance.

5 Claims, 3 Drawing Sheets

MULTI-JOINT ROBOT HAVING GAS SPRING, AND METHOD FOR ESTIMATING INNER PRESSURE OF THE GAS SPRING

BACKGROUND OF THE INVENTION

1. Field of the Invention

The preset invention relates to a multi-joint robot having a gas spring, in particular, relates to a technique for estimating an amount of decrease in inner pressure of the gas spring.

2. Description of the Related Art

A gas spring has a piston structure in which a compressible inert gas (hereinafter, merely referred to as "gas") is enclosed, and is capable of generating reactive force by compressing the gas due to the motion of a piston rod relative to a cylinder. Generally, such a gas spring is small and lightweight in comparison to a coil spring having the same degree of output as the gas spring, and thus the gas spring is useful for reducing the size and weight of an entire system.

In a multi-joint robot having a gravitative axis, as an apparatus for supplementing a power (or torque) of a servomotor for driving the axis, an apparatus (hereinafter, referred to as a balancer), capable of generating a force in a direction opposite to a direction of a load due to gravity, may be utilized. When the gas spring is applied to the balancer (such a balancer is referred to as a gas balancer), since an output of the gas spring is relatively high in spite of its size and weight, the gas spring can generate relatively high auxiliary torque with a compact mechanism. Therefore, by virtue of the gas spring, a compact and lightweight robot capable of conveying a relatively heavy load may be constituted.

For example, JP H10-138189 A discloses a balancer for reducing a load moment of a vertical rotation axis 2 which drives a rotating arm 3 on a base 1. The balancer has a cylinder 4, a rod 5 and a piston 6, wherein an air-compressing chamber 10 is connected to cylinder 4 via a communication part 11, and gas such as air (compressible fluid) and viscous liquid such as oil are enclosed in cylinder 4 and chamber 10.

On the other hand, in the gas spring, it is known that gas enclosed in the cylinder may leak to the outside the cylinder due to the motion of the piston rod relative to the cylinder, whereby inner pressure of the cylinder is gradually decreased. Therefore, the force generated by the balancer is lowered, resulting in an alarm for informing of scarcity of torque is output and a robot is brought to an emergency stop.

As means for avoiding such a disadvantage due to the reduction of the inner pressure of the cylinder, some techniques have been proposed. For example, JP 2007-298513 A discloses a circuit pressure display device capable of displaying the reduction of inner pressure of a gas spring circuit. JP 2009-270987 A discloses a pressure indicator for a gas spring, configured to indicate the pressure of compressible gas contained in a gas filling chamber of the gas spring.

Further, JP 2012-519083 A discloses a balancing device including a gas spring 4 and a compression system 5. Compression system 5 has a compressor 6 and an automatic control system 7 for adjusting the pressure within gas spring 4, wherein automatic control system 7 controls a pressure control valve 9 for limiting a flow rate of gas from or to gas spring 4, based on a signal from a pressure sensor 8 for detecting the pressure in gas spring 4.

As described in JP 2007-298513 A or JP 2009-270987 A, when the pressure indicator is attached to the outside of the gas spring, cost of equipment is increased depending on the cost of the pressure indicator. It is necessary to arrange a connecting means such as a connector between the pressure indicator and the gas spring, while the connecting means increases the possibility of gas leakage. Further, the gas leakage may occur due to breakage of the pressure indicator.

As described in JP 2012-519083 A, when the pressure sensor and the pressure control valve are arranged in the gas spring, a cost of equipment is increased at least depending on a cost of the sensor and the valve, and the possibility of gas leakage is raised, similarly to JP 2007-298513 A or JP 2009-270987 A. Further, since a device such as a gas tank 11 connected to pressure control valve 9 is necessary, peripheral equipment may get larger.

SUMMARY OF THE INVENTION

Therefore, an object of the present invention is to provide a multi-joint robot having a function for estimating an amount of decrease in inner pressure of a gas spring, by means of a simple and low-cost structure, and a method for estimating the amount of decrease in inner pressure of the gas spring.

According to one aspect of the present invention, a multi-joint robot is provided, comprising: a robot mechanical unit having at least one arm; a gas spring arranged on the arm; and a controller which controls the robot mechanical unit, wherein the gas spring comprises a cylinder, compressible inert gas enclosed within the cylinder and a piston rod configured to slide in the cylinder, the gas spring being configured as a gas balancer for reducing a load of a servomotor which drives the arm, and wherein the controller has a function to calculate a total movement distance of the piston rod by integrating an amount of back-and-forth motion of the piston rod relative to the cylinder, and calculate an amount of decrease in inner pressure of the compressible inert gas based on the total movement distance.

In a preferred embodiment, the controller calculates the total movement distance of the piston rod by integrating a difference of a projecting length of the piston rod from the cylinder at micro time intervals, the projecting length being geometrically calculated based on a rotation angle of the arm.

In a preferred embodiment, the controller calculates the amount of decrease in inner pressure of the compressible inert gas, by using at least one of parameters including: an absolute value of inner pressure of the cylinder; a back-and-forth motion velocity of the piston rod relative to the cylinder; and a temperature of the gas spring, as well as the total movement distance of the piston rod.

In a preferred embodiment, the robot comprises means configured to visually or aurally output at least one of the calculated total movement distance of the piston rod and the amount of decrease in inner pressure of the compressible inert gas.

According to another aspect of the present invention, a method for estimating an amount of decrease in inner pressure of a gas spring of a multi-joint robot is provided, the multi-joint robot comprising: a robot mechanical unit having at least one arm; a gas spring arranged on the arm; and a controller which controls the robot mechanical unit, wherein the gas spring comprises a cylinder, compressible inert gas enclosed within the cylinder and a piston rod configured to slide in the cylinder, the gas spring being configured as a gas balancer for reducing a load of a servomotor which drives the arm, and wherein the method comprising the steps of: calculating a total movement distance of the piston rod by integrating an amount of back-and-forth motion of the piston rod relative to the cylinder; and calculating an amount of decrease in inner pressure of the compressible inert gas based on the total movement distance.

BRIEF DESCRIPTION OF THE DRAWINGS

The above and other objects, features and advantages of the present invention will be made more apparent by the following description of the preferred embodiments thereof, with reference to the accompanying drawings, wherein.

DETAILED DESCRIPTIONS

Figure 1:
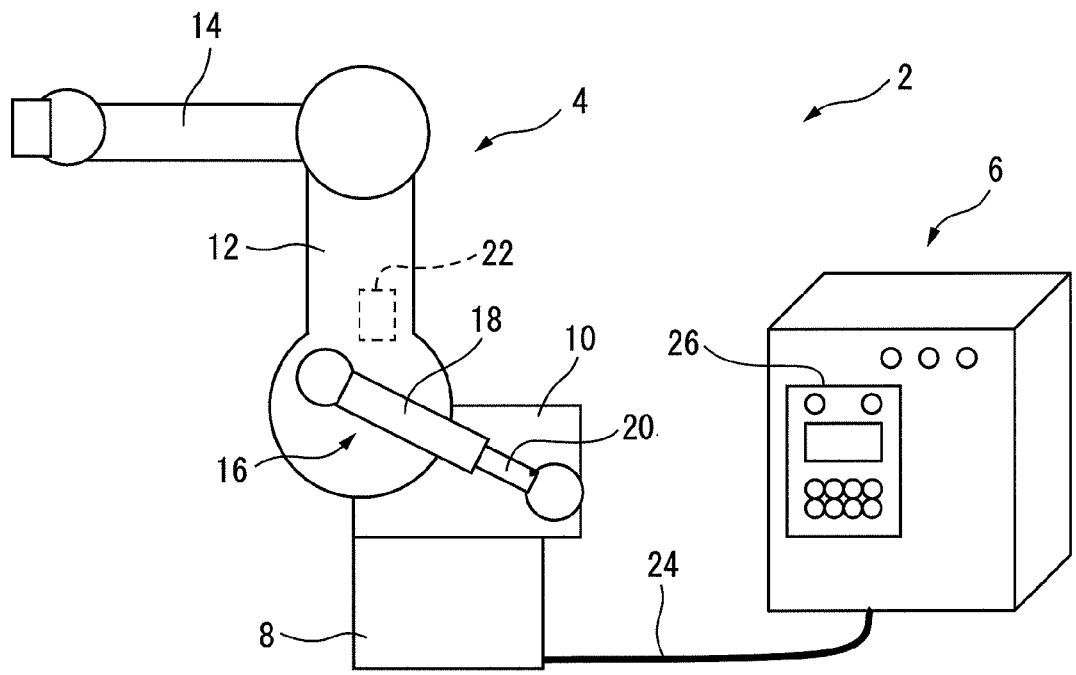
FIG. 1 shows a schematic configuration of a multi-joint robot according to a preferred embodiment of the present invention.

FIG. 1 shows a schematic configuration of a multi-joint robot according to a preferred embodiment of the present invention. Multi-joint robot 2 includes a robot mechanical unit 4 having at least one arm 12, a controller 6 which controls robot mechanical unit 4, and a gas spring arranged on the at least one arm. In the illustrated embodiment, robot mechanical unit 4 has a base 8, a rotating body 10 rotatably attached to base 8, a lower arm 12 rotatably attached to rotating body 10, and an upper arm 14 rotatably attached to lower arm 12. Multi-joint robot 2 further has a gas spring 16 associated with lower arm 12. Gas spring 16 has a cylinder 18 rotatably attached to lower arm 12, and a piston rod 20 rotatably attached to rotating body 10, wherein piston rod 20 is configured to slide in cylinder 18. In cylinder 18, compressible inert gas is enclosed. Gas spring 16 is used as a gas balancer for reducing a load of a servomotor 22 which drives lower arm 12 to which a gravity load is applied.

Controller 6 is connected to robot mechanical unit 4 via a power feeding cable, etc., so as to control the motion of each axis of robot mechanical unit 4. Controller 6 may have an operation panel 26 with a monitor, on which a total movement distance of piston rod 20 and/or estimated inner pressure of cylinder 18 as described below.

The gas pressure (or inner pressure) within cylinder 18 of gas spring 16 decreases in connection with the motion of the arm (in this case, lower arm 12) associated with gas spring 16. As a cause of the decrease in the inner pressure, leakage of gas within a small gap between piston rod 20 and a sealing member (not shown) for sealing the compressible gas within the gas spring due to the motion of the piston rod, and/or abrasion of the sealing member due to the motion of piston rod 20, may be possible. In the present invention, in view of a finding that the amount of decrease in inner pressure of the gas pressure due to the above causes has a high correlation with a total movement distance obtained by integrating an amount of back-and-forth motion of piston rod 20 relative to cylinder 18, an amount of decrease in inner pressure within the gas spring is estimated by calculating the total movement distance.

Figure 2:
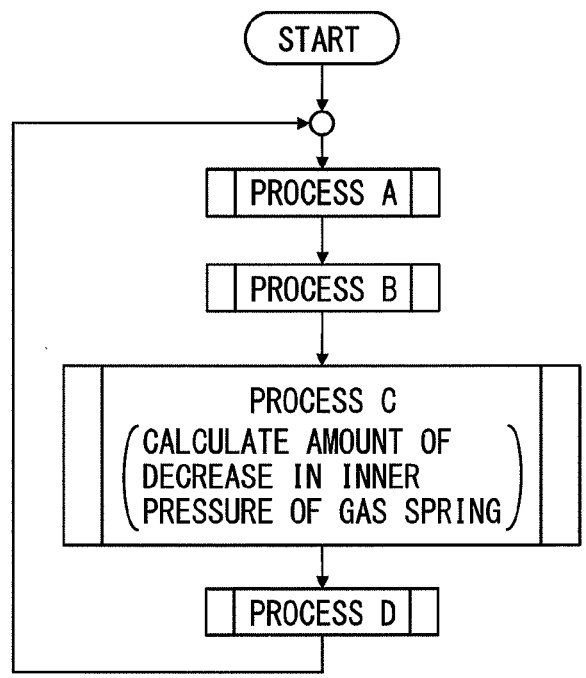
FIG. 2 is a flowchart showing an example of motion control executed by a controller of the multi-joint robot of FIG. 1.

FIG. 2 is a flowchart showing an example of motion control for multi-joint robot 2 executed by controller 6 at micro time intervals (or at control periods of time). Controller 6 generates a command for controlling the motion of each axis of multi-joint robot 2 at predetermined control periods of time, and transmits the command to robot 2, etc., based on a given robot program. In the embodiment of FIG. 2, controller 6 executes processes A to D at micro time intervals, and process C corresponds to a process for calculating an amount of decrease in inner pressure of the gas spring. As such, the process for calculating the amount of decrease in inner pressure may be easily incorporated into the procedure executed by controller 6.

Figure 3:
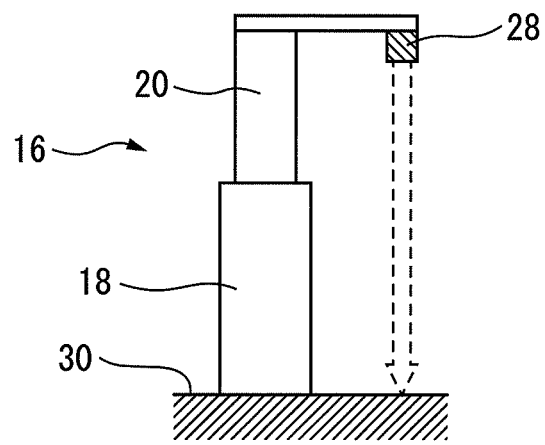
FIG. 3 is a view showing a first structural example for calculating a total movement distance of a piston rod relative to a cylinder.

FIG. 3 is a view showing a first structural example for calculating a total movement distance of piston rod 20 relative to cylinder 18, the total movement distance being a basis for calculating the amount of decrease in inner pressure of gas spring 16. To piston rod 20 of gas spring 16, a range sensor (or a distance sensor) 28 such as a laser displacement meter is attached, wherein the range sensor is operated substantially integrated with piston rod 20. Range sensor 28 is configured to detect a distance between range sensor 28 and a fixed portion or surface 30 integrally formed with cylinder 18. An amount of variation in the distance detected by range sensor 28 corresponds to a back-and-forth motion distance of piston rod 20 relative to cylinder 18. Therefore, by integrating the amount of variation in the distance detected by range sensor 28, the total amount of movement of piston rod 20 relative to cylinder 18 can be calculated.

Normally, lower arm 12 often carries out irregular swing motion, and thus the back-and-forth motion of piston rod 20 of gas spring arranged on lower arm 12 is also complicated. In such a case, in order to calculate the amount of variation in the projecting distance of piston rod 20 by using the range sensor, it is necessary to attach the range sensor to cylinder 18 or piston rod 20, whereas the attachment of the sensor may be difficult. Hereinafter, an example for calculating the projecting length of the piston rod without using the range sensor will be explained.

Figure 4:
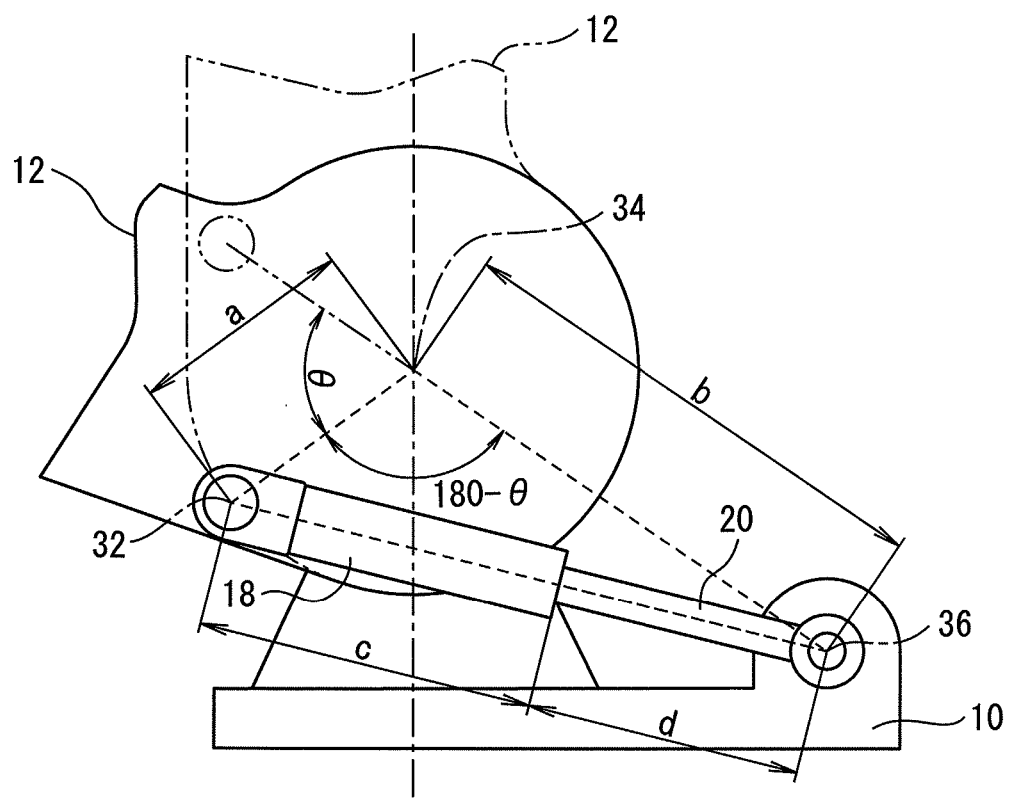
FIG. 4 is a view showing a second structural example for calculating a total movement distance of a piston rod relative to a cylinder.

FIG. 4 is a view showing a second structural example for calculating a total movement distance of piston rod 20 relative to cylinder 18, the second structural example being particularly available for multi-joint robot 2 of FIG. 1. In this example, a movement distance of piston 20 relative to cylinder 18 is calculated, when lower arm 12 is rotatably moved from a first position (indicated by a two-dot chain line in FIG. 4) where lower arm 12 extends in the generally vertical direction to a second position (indicated by a solid line in FIG. 4) where lower arm 12 is rotated by an angle θ in a counterclockwise direction relative to rotating body 10.

As shown in FIG. 4, a distance from a connection point 32 between lower arm 12 and gas spring 16 (cylinder 18) to a rotation center 34 of lower arm 12 is determined as a distance "a," a distance from a connection point 36 between rotating body 10 and gas spring 16 (piston rod 20) to rotation center 34 of lower arm 12 is determined as a distance "b," and an entire length of cylinder 18 is determined as a distance "c." In this case, a projecting length "d" of piston rod 20 from cylinder 18 can be geometrically calculated by using following equation (1).

$$d = (a^2 + b^2 - 2 \cdot a \cdot b \cdot \cos(180 - \theta))^{1/2} - c \qquad (1)$$

In equation (1), distances a, b and c are constant. Therefore, by detecting rotation angle θ of lower arm 12 at micro periods of time, projecting length d of piston rod 20 can be geometrically and easily calculated. In the example of FIG. 4, since rotation angle θ may be detected by using an encoder (not shown) which is used for feedback control of lower arm 12, it is not necessary to use the range sensor, etc., as in the example of FIG. 3.

Figure 5:
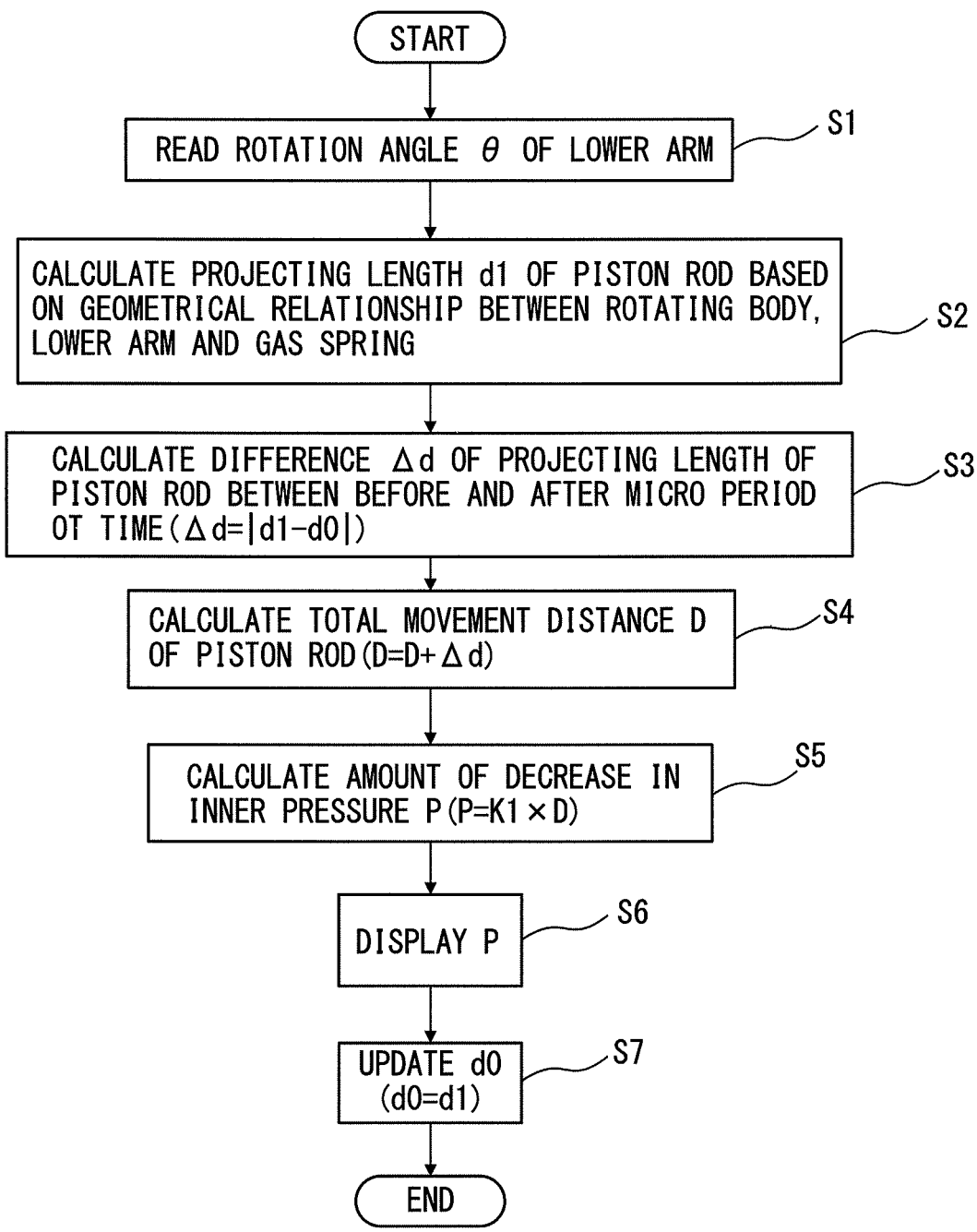
FIG. 5 is a flowchart showing a procedure for calculating the total movement distance of the piston rod and an amount of decrease in inner pressure of a gas spring, by using the structure of FIG. 4.

FIG. 5 a flowchart showing a detail of process C in the flowchart of FIG. 2, wherein the total movement distance of the piston rod and the amount of decrease in inner pressure of the gas spring are calculated by using the configuration of FIG. 4. First, in step S1, rotation angle θ of lower arm 12 relative to rotating body 10 is read. As rotating angle θ, an output from the encoder, etc., capable of detecting the rotation angle of lower arm 12, may be used.

Next, in step S2, a projecting length d1 of piston rod 20 from cylinder 18 is calculated, based on the geometrical relationship between rotating body 10, lower arm 12 and gas spring 16 (concretely, the positional relationship between rotation center 34, connection point 32 and connection point 36).

Next, in step S3, a difference (absolute value), between d1 and a projecting length d0 of the piston rod obtained by the similar calculation in the previous or last control period, is determined as a difference Δd (=|d1−d0|). In other words, difference Δd corresponds to a movement distance of piston rod 20 in each control period during the robot is operated.

Next, in step S4, a total movement distance D of piston rod 20 relative to cylinder 18 is updated. Concretely, difference Δd calculated in step S3 is added to a total movement distance D calculated in the previous or last control period, and a result is determined as a new total movement distance.

Next, in step S5, based on updated total movement distance D, the amount of decrease in inner pressure of the gas spring is calculated. In the example of FIG. 5, in view of the finding that amount of decrease in inner pressure P is approximately proportional to total movement distance D, amount of decrease in inner pressure P is calculated by multiplying total movement distance D by an inner pressure conversion factor K1, and the calculation result is determined as an estimated amount of decrease in inner pressure. In addition, total movement distance D and amount of decrease in inner pressure P may be calculated by software incorporated in controller 6.

Next, in step S6, calculated amount of decrease in inner pressure P is displayed in real time on the monitor of operation panel 26 of controller 6. By virtue of this, an operator can be easily informed of the amount of decrease in inner pressure of the gas spring, and can take quick and necessary measures corresponding to the amount of decrease. Instead of or in addition to the amount of decrease in inner pressure, total movement distance D calculated in step S4 may be displayed. Further, an alarm may be output when the amount of decrease in inner pressure or the total movement distance exceeds a predetermined threshold. As such, controller 6 can output at least one of total movement distance D and amount of decrease in inner pressure P in real time, whereby the operator can be rapidly informed of the output information visually or aurally.

Finally, in step S7, difference d1 calculated in step S2 is updated to d0 for the process in the next control period. The process in step S7 may be executed at any time after step S3.

As can be seen from the flowchart of FIG. 5, by integrating the difference of the projecting length of the piston rod from the cylinder calculated by the rotation angle of the arm at micro time intervals, the total movement distance of the piston rod can be calculated, and the amount of decrease in inner pressure of the gas spring can be estimated by using the calculated total movement distance of the piston rod as a parameter.

In the example of FIG. 5, the amount of decrease in inner pressure of the gas spring is considered to be proportional to the total movement distance of the piston rod (P=K1×D). In fact, the mount of decrease in inner pressure of the gas spring also depends on an absolute value of inner pressure in the cylinder, a back-and-forth movement velocity of the piston rod relative to the cylinder, and the temperature (or the environmental temperature) of the gas spring, etc. Therefore, in the process of step S5, the amount of decrease in inner pressure of the gas pressure may be calculated by using an equation including at least one of the absolute value of the inner pressure in the cylinder, the back-and-forth movement velocity of the piston rod relative to the cylinder, and the temperature of the gas spring, as a parameter, as well as the total movement distance of the piston rod. For example, data of the amount of decrease in inner pressure of the gas spring may be previously and experimentally obtained by changing the absolute value of the inner pressure in the cylinder, the back-and-forth movement velocity of the piston rod relative to the cylinder and the temperature of the gas spring, and a correlating equation may be generated by considering a parameter based on the data. As such, by considering the parameter other than the total movement distance, the amount of decrease in inner pressure can be estimated more precisely, while matching actual use conditions of the gas spring.

While the preferred embodiment of the present invention is explained above, the present invention is not limited to the embodiment. For example, although the gas spring explained with reference to FIG. 1 assists servomotor 22 of lower arm 12 which pivots in the back-and-forth direction (or the horizontal direction), a gas spring of a robot configured to support a driven axis to which the gravity is applied may have the same function and effect as described above. In other words, the present invention may be applied to lower arm 12 when the lower arm pivots in the vertical or oblique direction, and may also be applied to an arm other than the lower arm. Further, since the geometrical relationship between the gas spring and the robot arm may have various patterns, an equation for calculating the projecting length of the piston rod is not limited to above equation (1).

According to the present invention, since the amount of decrease in inner pressure of the gas spring can be estimated based on the total movement distance of the piston rod relative to the cylinder, a pressure gauge or a sensor for measuring the inner pressure is not necessary, whereby a system including the robot may be compact and low in cost.

By geometrically calculating the total movement distance of the piston rod from the rotation angle of the arm at micro time intervals, a range sensor, etc., is not necessary, whereby the cost of the system may be further reduced.

When the amount of decrease in inner pressure of the gas pressure is calculated, the amount of decrease in the inner pressure can be estimated more precisely, by using at least one of the absolute value of the inner pressure in the cylinder, the back-and-forth movement velocity of the piston rod relative to the cylinder and the temperature of the gas spring, as a parameter, as well as the total movement distance of the piston rod.

By visually or aurally outputting at least one of the total movement distance of the piston rod and the amount of decrease in inner pressure of the gas, the operator can be rapidly informed of the output information visually or aurally.

While the invention has been described with reference to specific embodiments chosen for the purpose of illustration, it should be apparent that numerous modifications could be made thereto, by one skilled in the art, without departing from the basic concept and scope of the invention.

The invention claimed is:
1. A multi-joint robot comprising:
a robot mechanical unit having at least one arm;
a gas spring arranged on the arm; and
a controller which controls the robot mechanical unit,
wherein the gas spring comprises a cylinder, compressible inert gas enclosed within the cylinder and a piston rod configured to slide in the cylinder, the gas spring being configured as a gas balancer for reducing a load of a servomotor which drives the arm, and wherein the controller has a function to calculate a total movement distance of the piston rod by integrating an amount of back-and-forth motion of the piston rod relative to the cylinder, and calculate an amount of decrease in inner pressure of the compressible inert gas based on the total movement distance.

2. The multi-joint robot as set forth in claim 1, wherein the controller calculates the total movement distance of the piston rod by integrating a difference of a projecting length of the piston rod from the cylinder at micro time intervals, the projecting length being geometrically calculated based on a rotation angle of the arm.

3. The multi-joint robot as set forth in claim 1, wherein the controller calculates the amount of decrease in inner pressure of the compressible inert gas, by using at least one of parameters including: an absolute value of inner pressure of the cylinder; a back-and-forth motion velocity of the piston rod relative to the cylinder; and a temperature of the gas spring, as well as the total movement distance of the piston rod.

4. The multi-joint robot as set forth in claim 1, wherein the robot comprises means configured to visually or aurally output at least one of the calculated total movement distance of the piston rod and the amount of decrease in inner pressure of the compressible inert gas.

5. A method for estimating an amount of decrease in inner pressure of a gas spring of a multi-joint robot, the multi-joint robot comprising:
   a robot mechanical unit having at least one arm;
   a gas spring arranged on the arm; and
   a controller which controls the robot mechanical unit,
   wherein the gas spring comprises a cylinder, compressible inert gas enclosed within the cylinder and a piston rod configured to slide in the cylinder, the gas spring being configured as a gas balancer for reducing a load of a servomotor which drives the arm, and
   wherein the method comprising the steps of:
      calculating a total movement distance of the piston rod by integrating an amount of back-and-forth motion of the piston rod relative to the cylinder; and
      calculating an amount of decrease in inner pressure of the compressible inert gas based on the total movement distance.

\* \* \* \* \*